(12) United States Patent
Allendorf et al.

(10) Patent No.: US 9,662,632 B1
(45) Date of Patent: May 30, 2017

(54) METAL-ORGANIC FRAMEWORKS FOR ADSORPTION AND SEPARATION OF NOBLE GASES

(71) Applicant: Sandia Corporation, Albuquerque, NM (US)

(72) Inventors: Mark D. Allendorf, Pleasanton, CA (US); Jeffery A. Greathouse, Albuquerque, NM (US); Chad Staiger, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 33 days.

(21) Appl. No.: 14/662,098

(22) Filed: Mar. 18, 2015

Related U.S. Application Data

(60) Provisional application No. 61/955,921, filed on Mar. 20, 2014.

(51) Int. Cl.
*B01J 20/22* (2006.01)
*B01D 53/04* (2006.01)
*B01D 53/047* (2006.01)

(52) U.S. Cl.
CPC .......... *B01J 20/226* (2013.01); *B01D 53/047* (2013.01); *B01D 53/0462* (2013.01); *B01D 2253/204* (2013.01); *B01D 2257/11* (2013.01)

(58) Field of Classification Search
CPC .............. B01D 53/0462; B01D 53/047; B01D 2253/204; B01D 2257/11; B01J 20/226
USPC ................................ 95/90, 96, 127; 502/401
See application file for complete search history.

(56) References Cited

U.S. PATENT DOCUMENTS

| | | | |
|---|---|---|---|
| 7,524,444 B2 | 4/2009 | Hesse et al. | |
| 2009/0155588 A1 | 6/2009 | Hesse et al. | |
| 2009/0183996 A1* | 7/2009 | Richter | B01J 20/226 205/424 |
| 2010/0132549 A1* | 6/2010 | Yaghi | B01D 53/02 95/128 |
| 2012/0073438 A1* | 3/2012 | Ryan | B01D 53/02 95/127 |
| 2012/0210872 A1* | 8/2012 | Duan | B01J 20/22 95/127 |
| 2015/0246340 A1* | 9/2015 | Zaworotko | B01J 20/226 95/127 |

OTHER PUBLICATIONS

Allendorf, M. D., et al., "A roadmap to implementing metal-organic frameworks in electronic devices: challenges and critical directions", Chem. Eur. J., 17, (2011), 11372-11388.
Betard, A., et al., "Metal-organic framework thin films: from fundamentals to applications", Chem. Rev., 112, (2012), 1055-1083.
(Continued)

*Primary Examiner* — Frank Lawrence
(74) *Attorney, Agent, or Firm* — Blakely. Sokoloff, Taylor & Zafman, LLP

(57) ABSTRACT

A method including exposing a gas mixture comprising a noble gas to a metal organic framework (MOF), including an organic electron donor and an adsorbent bed operable to adsorb a noble gas from a mixture of gases, the adsorbent bed including a metal organic framework (MOF) including an organic electron donor.

18 Claims, 5 Drawing Sheets

(56) References Cited

OTHER PUBLICATIONS

Cychosz, K. A., et al., "Liquid phase separation by crystalline microporous coordination polymers", Chem. Sci., 1, (2010), 293-302.

Doty, F. P., et al., "Scintillating metal-organic frameworks: a new class of radiation detection materials", Adv. Mater., 21, (2009), 95-101.

Duren, T., et al., "Using molecular simulation to characterize metal-organic frameworks for adsorption applications", Chem. Soc. Rev., 38, (2009), 1237-1247.

Farha, O. K., et al., "Metal-Organic framework materials with ultrahigh surface areas: is the sky the limit?", J. Am. Chem. Soc., 134, (2012), 15016-15021.

Fernandez, C. A., et al., "Switching Kr/Xe selectivity with temperature in a metal-organic framework", J. Am. Chem. Soc., (2012), 4 pages.

Getman, R. B., et al., "Review and analysis of molecular simulations of methane, hydrogen, and acetylene storage in metal-organic frameworks", Chem. Rev., 112, (2012), 703-723.

Horcajada, P., et al., "Metal-organic frameworks in biomedicine", Chem. Rev., 112(2), (2012), 1232-1268.

Horcajada, P., et al., "Porous metal-organic-framework nanoscale carriers as a potential platform for drug delivery and imaging", Nature Materials, vol. 9, (2010), 172-178.

Hutchinson, M. H., et al., "Excimers and excimer lasers", Appl. Phys., 21, (1980), 95-114.

Justel, T., et al., "VUV spectroscopy of luminescent materials for plasma display panels and Xe discharge lamps", Journal of Luminescence, 93, (2001), 179-189.

Kebabian, P. L., et al., "Determination of argon-filled insulated glass window seal failure by spectroscopic detection of oxygen", Meas. Sci.Technol., 14, (2003), 983-988.

Kennedy, R. R., et al., "Anaesthesia and the 'inert' gases with special reference to xenon", Anaesth Intensive Care, 20(1), (1992), 66-70.

Kreno, L. E., et al., "Metal-organic framework materials as chemical sensors", Chem. Rev., 112(2), (2012), 1105-1125.

Kuo, D. H., et al., "Growth and properties of alumina films obtained by low-pressure metal-organic chemical vapor deposition", Thin Solid Films, 398-399, (2001), 35-40.

Lawler, K. V., et al., "Nanoporous metal formates for krypton/xenon separation", Chem. Commun., 49, (2013), 10959-10961.

Lee, J. Y., et al., "Metal-organic framework materials as catalyst", Chem. Soc. Rev., 38, (2009), 1450-1459.

Li, J. R., et al., "Carbon dioxide capture-related gas adsorption and separation in metal-organic frameworks", Coordination Chemistry Reviews, 255, (2011), 1791-1823.

Li, J. R., et al., "Metal-organic frameworks for separations", Chem. Rev., 112(2), (2012), 869-932.

Li, K., et al., "Multifunctional Microporous MOFs Exhibiting Gas/Hydrocarbon Adsorption Selectivity, Separation Capability and Three-Dimensional Magnetic Ordering", Adv. Funct. Mater., 18, (2008), 2205-2214.

Lomaev, M. I., et al., "Capacitive and barrier discharge excilamps and their applications (review)", Instruments and Experimental Techniques, vol. 49, No. 5, (2006), 595-616.

Ma, L., et al., "Enantioselective catalysis with homochiral metal-organic frameworks", Chem. Soc. Rev., 38(5), (2009), 1248-1256.

McIntyre, I. A., et al., "High power ultrafast excimer lasers", Journal of Applied Physics, 69, R1, (1991), R1-R19.

Monge, A., et al., "One teflon® -like channelled nanoporous polymer with a chiral and new uninodal 4-connected net: sorption and catalytic properties", Chem. Commun., (2005), 1291-1293.

Murray, L. J., et al., "Hydrogen storage in metal-organic frameworks", Chem. Soc. Rev., 38, (2009), 1294-1314.

Perry IV, J. J., et al., "Connecting structure with function in metal-organic frameworks to design novel photo-and radioluminescent materials", J. Mater. Chem., 22, (2012), 10235-10248.

Preckel, B., et al., "Molecular mechanisms transducing the anesthetic, analgesic, and organ-protective actions of xenon", Anesthesiology, 105, (2006), 187.

Sircar, S., "Pressure swing adsorption", Ind. Eng. Chem. Res., 41, (2002), 1389-1392.

Stephan, K., et al., "Heat-transfer correlations for natural convection boiling", Int. J. Heat Mass Transfer, vol. 23, (1980), 73-87.

Suh, M. P., et al., "Hydrogen storage in metal-organic frameworks", Chem. Rev., 112, (2012), 782-835.

Sumida, K., et al., "Carbon dioxide capture in metal-organic frameworks", Chem. Rev., 112, (2012), 724-781.

Van Heest, T., et al., "Identification of metal-organic framework materials for adsorption separation of rare gases: applicability of ideal adsorbed solution theory (IAST) and effets of inaccessible framework regions", J. Phys. Chem., C, 116, (2012), 13183-13195.

Viertelhaus, M., et al., "Iron(II) Fromate [Fe($O_2$CH)$_2$]·1/3HCO$_2$H: A Mesoporous Magnet—Solvothermal Syntheses and Crystal Structures of the Isomorphous Framework Metal(II) Formates [M($O_2$CH)$_2$]·n(Solvent) (M=Fe, Co, Ni, Zn, Mg)", Eur. J. Inog. Chem., (2005), 692-703.

Wang, H., et al., "The first example of commensurate adsorption of atomic gas in a MOF and effective separation of xenon form other noble gases", Chem. Sci., 5, (2013), 620-624.

Wang, Z., et al., "Synthesis and characterization of a porous magnetic diamond framework, Co$_3$(HCOO)$_6$, and its N2 sorption characteristic", Inorganic Chemistry, vol. 44, No. 5, (2005), 1230-1237.

Yoon, M., et al., "Homochiral metal-organic frameworks for asymmetric heterogeneous catalysis", Chem. Rev., 112, (2012), 1196-1231.

\* cited by examiner

METAL-ORGANIC FRAMEWORKS FOR ADSORPTION AND SEPARATION OF NOBLE GASES

CROSS-REFERENCE TO RELATED APPLICATION

This application claims the benefit of the earlier filing date of U.S. Provisional Patent Application No. 61/955,921, filed Mar. 20, 2014 entitled "METAL-ORGANIC FRAMEWORKS FOR ADSORPTION AND SEPARATION OF NOBLE GASES." The aforementioned application is hereby incorporated by reference, in its entirety, for all purposes.

STATEMENT OF GOVERNMENT RIGHTS

This invention was developed under Contract DE-AC04-94AL85000 between Sandia Corporation and the U.S. Department of Energy. The U.S. Government has certain rights in this invention.

FIELD

Gas separation.

BACKGROUND

Noble gases (also known as rare gases) are an important class of industrial chemicals essential to numerous applications, including lighting, insulation, cryogenic refrigerants, carrier gases, anesthetics, and excimer lasers. Most high-purity, industrial quantities of noble gases are obtained by separating the gas of interest from air.

Currently, most noble gases are obtained via cryogenic distillation—an extremely energy intensive and therefore costly process. Consequently, large-scale isolation of noble gases via selective adsorption near room temperature is highly desirable. Sorption-based processes using porous materials are generally difficult due to the low reactivity of these gases resulting from their filled valence shell. Thus, sorption-based separation processes must rely primarily on differences in atomic size and weak interactions (van der Waals forces) with surfaces. The processes of pressure-swing adsorption (PSA) and vacuum-swing adsorption (VSA) offer attractive alternatives to cryogenic distillation, in that they can be much more energy efficient and therefore cost-effective. However, PSA and VSA require efficient microporous or mesoporous adsorbents that are both highly selective and possess a high capacity. Traditionally, commercial sorbents have been limited to one of four categories: activated carbons, natural and synthetic zeolites, silica gel, and activated alumina. These materials typically have high surface areas and large pore volumes, enabling physisorption of weakly interacting adsorptives such as noble gases. Unfortunately, they also lack synthetic diversity; while currently many examples of commercial sorbents exist, in general, systematic alteration of their structure and chemistry is difficult. Thus, there is a great need for new microporous sorbents with adsorptive properties designed for specific adsorbates.

SUMMARY

A method including exposing a gas mixture including a noble gas to a metal organic framework (MOF) is described wherein the MOF has an organic electron donor having the formula of:

General Formula I:

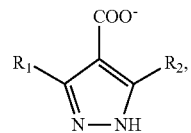

wherein $R_1$ and $R_2$ are independently selected from a branched or straight chain alkyl moiety that may be substituted (e.g., a perfluoroalkyl), or General Formula II:

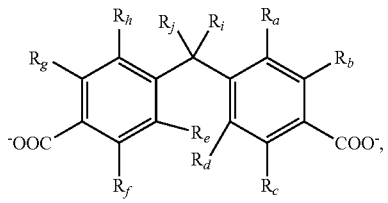

wherein $R_a$, $R_b$, $R_c$, $R_d$, $R_e$, $R_f$, $R_g$, and $R_h$ are independently selected from a hydrogen moiety, a straight or branched chain alkyl moiety having one to three carbons, an amine moiety, an ether moiety or a halide moiety and $R_i$ and $R_j$ are independently selected from a trifluoromethyl moiety, a straight or branched chain alkyl moiety having one to three carbons, or a phenyl moiety.

In another embodiment, an adsorbent bed is described that is operable to adsorb a noble gas from a mixture of gases. The adsorbent bed includes:

a metal organic framework (MOF) including an organic electron donor having the formula of:

General Formula I:

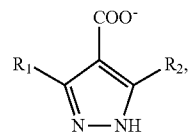

wherein $R_1$ and $R_2$ are independently selected from a branched or straight chain alkyl moiety that may be substituted (e.g., a perfluoroalkyl, or General Formula II:

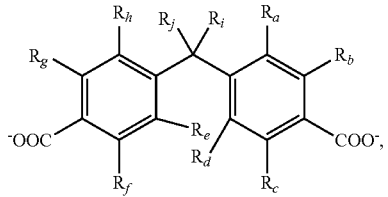

wherein $R_a$, $R_b$, $R_c$, $R_d$, $R_e$, $R_f$, $R_g$ and $R_h$ are independently selected from a hydrogen moiety, a straight or branched chain alkyl moiety having one to three carbons, an amine moiety or a halide moiety and $R_i$ and $R_j$ are independently selected from a trifluoromethyl, a straight or branched chain alkyl moiety having one to three carbons, or a phenyl moiety.

In another embodiment, a MOF of a cobalt formate is operable for selectively separating a noble gas from a gas mixture.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
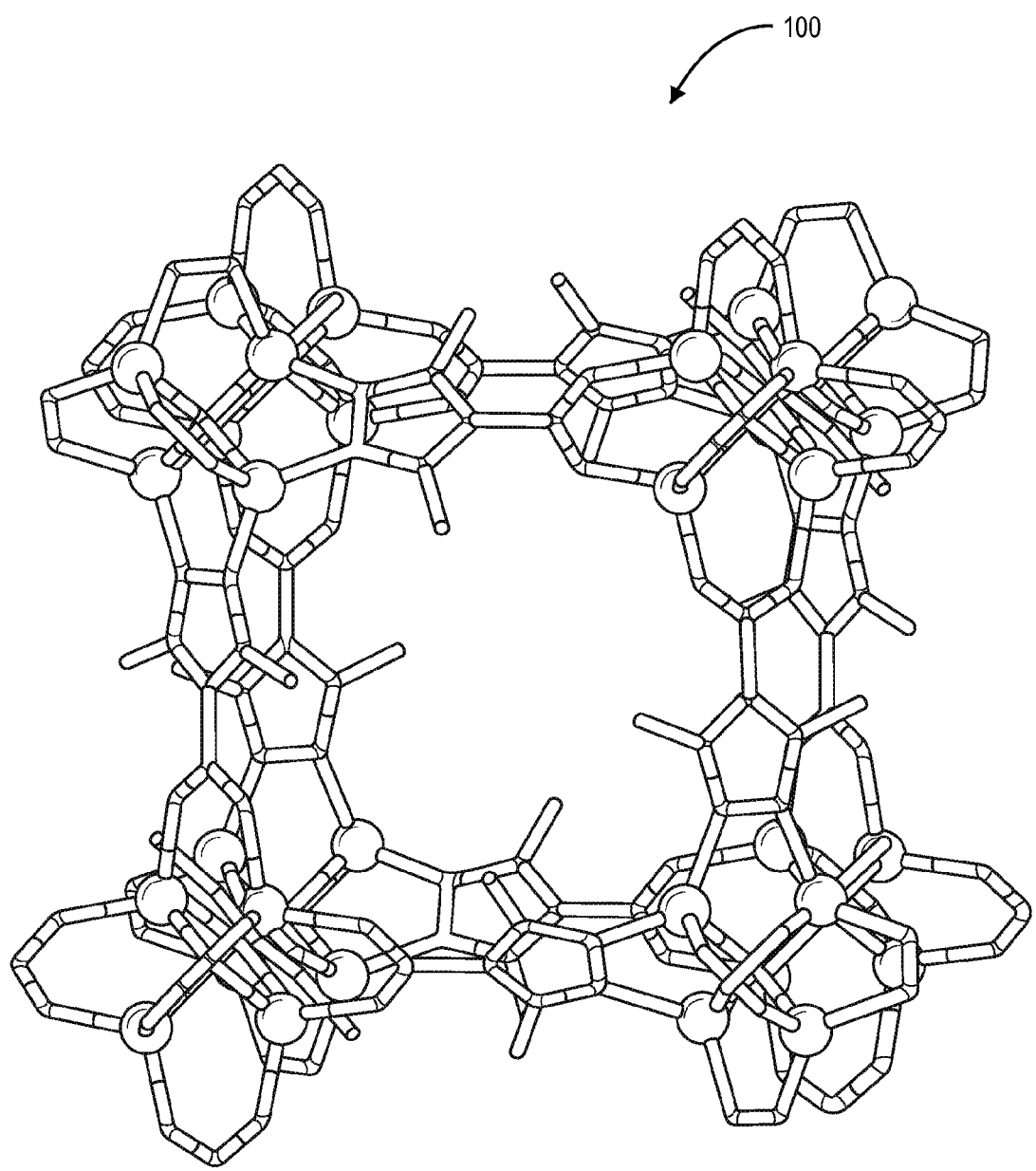
FIG. 1 illustrates a MOF including an electron donor having the formula of General Formula I where $R_1$ and $R_2$ are each methyl groups.

Metal-organic frameworks (MOFs) are crystalline materials including open frameworks comprised of metal cations bridged by organic electron donors. One particularly appealing aspect of MOFs is that they are often shown to be permanently microporous and can exhibit extremely high surface areas, in some cases the highest ever observed. Paired with these properties is a level of synthetic flexibility unprecedented in other classes of microporous materials such as porous carbons and zeolites.

In one embodiment, a class of MOFs is described that have the ability to adsorb (e.g., trap) noble gases and selectively separate such gases from one another and nitrogen. A method including exposing a gas mixture including a noble gas to a MOF is described wherein the MOF includes an organic electron donor having the formula:

General Formula I:

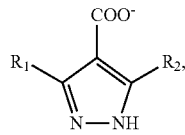

wherein $R_1$ and $R_2$ are independently selected from a branched or straight chain alkyl moiety, or General Formula II:

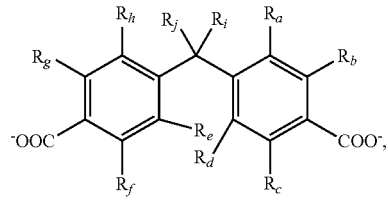

wherein $R_a$, $R_b$, $R_c$, $R_d$, $R_e$, $R_f$, $R_g$, and $R_h$ are independently selected from a hydrogen moiety, a straight or branched chain alkyl moiety having one to three carbons, an amine moiety or a halide moiety and $R_i$ and $R_j$ are independently selected from a trifluoromethyl, a straight or branched chain alkyl moiety having one to three carbons, or a phenyl moiety. Noble gas in the gas mixture exposed to the MOF is adsorbed (e.g., trapped) by the MOF and can then be separated using, for example, pressure (e.g., pressure swing adsorption) or temperature (e.g., temperature swing adsorption).

MOFs including an organic electron donor having the formula of General Formula I may be referred to as Pyra MOFs. The organic electron donor of a Pyra MOF generally has a pyrazole backbone with adjacent nitrogens at positions 3 and 4 of the five membered ring and a carboxylic acid at position 1. The carboxylic acid is deprotonated in the MOF (as illustrated in General Formula I). In one embodiment, a MOF including an organic electron donor having the formula of General Formula I has an $R_1$ and $R_2$ independently selected of an alkyl moiety having one to three carbon atoms. Examples include:

$R_1$, $R_2$ are each methyl or each ethyl;
$R_1$ is methyl;
$R_2$ is ethyl;
$R_1$ and $R_2$ are each n-propyl;
$R_1$ is methyl, $R_2$ is isopropyl; and
$R_1$ is methyl, $R_2$ is n-propyl.

Table 1 shows ideal selectivities (ratio of Henry's constants) for certain Pyra MOFs having an organic electron donor having the formula of General Formula I at 273 K and 292 K.

TABLE 1

| Pyra MOF | | Kr/N$_2$ | | Kr/Ar | | Xe/N$_2$ | | Xe/Ar | | Xe/Kr | |
|---|---|---|---|---|---|---|---|---|---|---|---|
| $R_1$ | $R_2$ | 273 | 292 | 273 | 292 | 273 | 292 | 273 | 292 | 273 | 292 |
| methyl | methyl | 3.95 | 3.47 | 4.46 | 3.88 | 37.2 | 25.3 | 41.9 | 28.3 | 9.40 | 7.29 |
| methyl | ethyl | 4.80 | 4.04 | 4.91 | 4.17 | 49.7 | 32.2 | 50.8 | 33.2 | 10.3 | 7.96 |
| ethyl | ethyl | 6.09 | 4.82 | 5.31 | 4.35 | 64.2 | 37.2 | 56.0 | 33.6 | 10.5 | 7.73 |
| methyl | isopropyl | 4.85 | 4.46 | 4.66 | 3.98 | 48.9 | 36.1 | 47.0 | 32.2 | 10.1 | 8.09 |
| methyl | n-propyl | 4.85 | 4.60 | 4.82 | 4.08 | 48.4 | 38.1 | 48.1 | 33.7 | 9.99 | 8.27 |

FIG. 1 illustrates a Pyra MOF 100 including an organic electron donor having the formula of General Formula I where $R_1$ and $R_2$ are each methyl and bridging copper cations ($Cu^{2+}$). The MOF may be represented by the formula: $Zn_4O(C_6H_6N_2O_2)_3$. In one embodiment, a process to form a Pyra MOF including an organic electron donor having the formula of General Formula I where $R_1$ and $R_2$ are each ethyl includes adding a solution of the electron donor 0.25 g in 10 ml of 1:24 EtOH:$H_2O$ (V:V) with 0.42 ml $Et_3N$ dropwise to a stirred solution of $Zn(NO_3)_2 \cdot 6H_2O$ (0.45 g) in 10 ml of 1:1 EtOH:$H_2O$, affording a white suspension. This suspension was refluxed for four hours. The white precipitate was collected by vacuum filtration, and washed with $H_2O$, EtOH, and $Et_2O$. The product was soaked in $Et_2O$ for three or more days with three solvent exchanges. A sample of this was degassed on the MasterPrep at 30° C. for one hour, and 120° C. for 48 hours, to obtain activated material for porosimetry.

Figure 2:
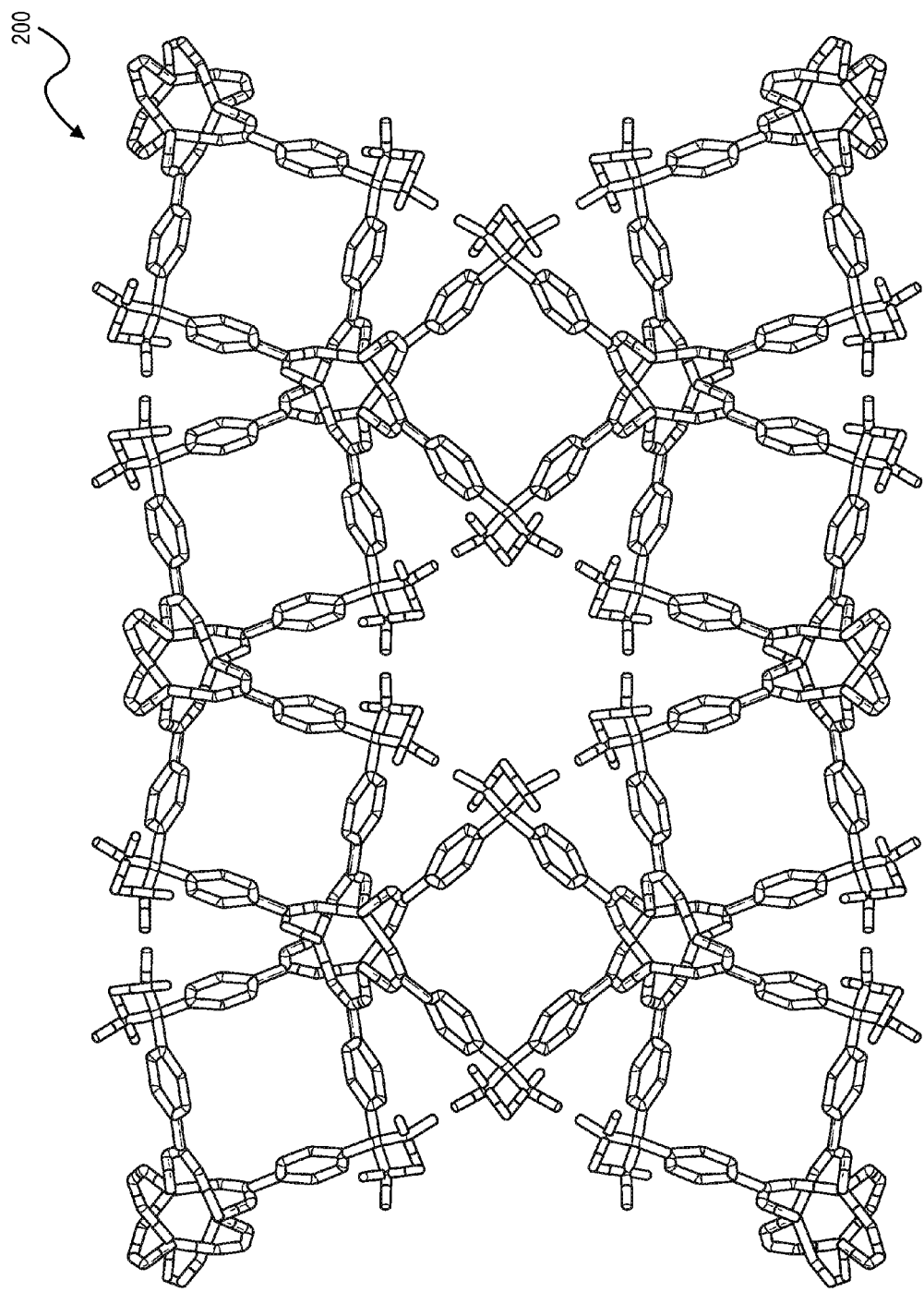
FIG. 2 illustrates a MOF including an electron donor having the formula of General Formula II where $R_a$-$R_h$ are each hydrogen and $R_i$ and $R_j$ are each trifluoromethyl bridging zinc cations.

A MOF including an organic electron donor having the formula of General Formula II where $R_a$-$R_h$ are each hydrogen and $R_i$ and $R_j$ are each trifluoromethyl is a YAPXIX MOF. The MOF may be represented by the formula: $Zn(C_{17}H_8F_6O_4)$. The deprotonated carboxylic acids bridge a metal cation. FIG. 2 illustrates a YAPXIX MOF with the deprotonated carboxylic acids bridging zinc cations. MOF 200 may be formed by combining an amount of an organic electron donor having the formula of General Formula II with zinc acetate ($Zn(OAc)_2$) in an ethanol and water mixture at 170° C. for 72 hours. In one embodiment, MOF 200 is made by a process described at "One Teflon®-like channeled nanoporous polymer with a chiral and new uninodal 4-connected net: sorption and catalytic properties," Monge, et al., The Royal Society of Chemistry, Chem. Commun., 2005, 1291-93.

Table 2 shows krypton/nitrogen and krypton/argon gas selectivities for the YAPXIX MOF by comparison of Henry's constants ($k_H/k_H$) and volume adsorbed (V/V) from zero atmosphere to one atmosphere and 292 K.

TABLE 2

| Gases | $k_H/k_H$ (0-0.1 atm) | V/V 0.2 atm | V/V 0.4 atm | V/V 0.6 atm | V/V 0.8 atm | V/V 1 atm |
| --- | --- | --- | --- | --- | --- | --- |
| Kr/$N_2$ | 6.5 | 5.9 | 5.0 | 4.4 | 4.0 | 3.7 |
| Kr/Ar | 6.3 | 5.9 | 4.9 | 4.3 | 3.8 | 3.7 |

Figure 3:
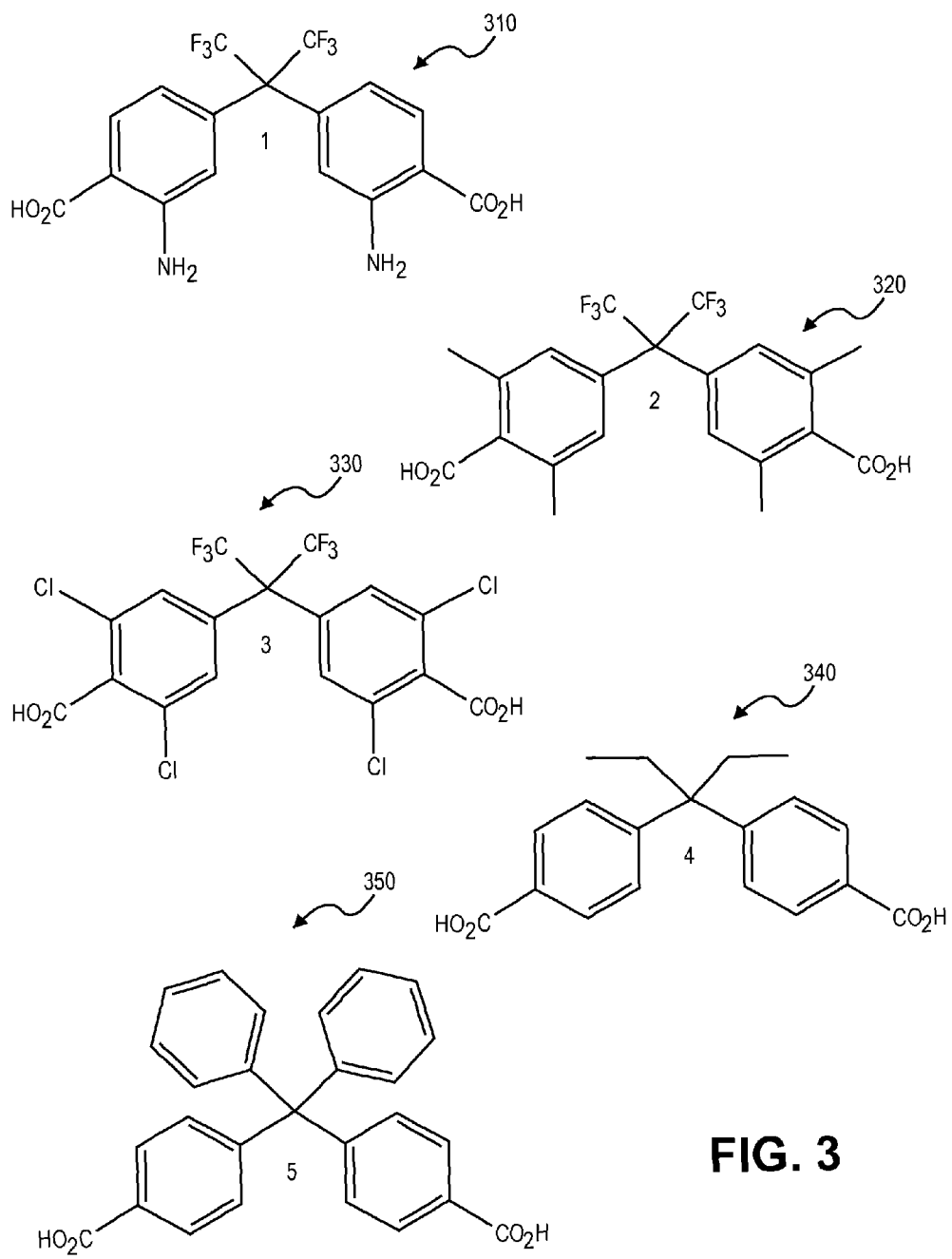
FIG. 3 presents representative electron donors for a MOF, the representative electron donors having the formula of General Formula II.

Other examples of YAPXIX-type including an organic electron donor having the formula of General Formula II and shown in FIG. 3 include:

$R_a$, $R_b$, $R_d$, $R_e$, $R_g$ and $R_h$ are each hydrogen; $R_c$ and $R_f$ are each a primary amine group; $R_i$ and $R_j$ are each trifluoromethyl (donor 310);

$R_a$, $R_d$, $R_e$ and $R_h$ are each hydrogen; $R_b$, $R_c$, $R_f$ and $R_g$ are each methyl; and $R_i$ and $R_j$ are each trifluoromethyl (donor 320);

$R_a$, $R_d$, $R_e$ and $R_h$ are each hydrogen; $R_b$, $R_c$, $R_f$ and $R_g$ are each chlorine; and $R_i$ and $R_j$ are each trifluoromethyl (donor 330);

$R_a$, $R_b$, $R_c$, $R_d$, $R_e$, $R_f$, $R_g$ and $R_h$ are each hydrogen; and $R_i$ and $R_j$ are each ethyl (donor 340); and $R_a$, $R_b$, $R_c$, $R_d$, $R_e$, $R_f$, $R_g$ and $R_h$ are each hydrogen; and $R_i$ and $R_j$ are each phenyl (donor 350).

In another embodiment, a MOF of cobalt formate is operable for adsorption and separation of noble gases from a mixture of gases such as separation of one noble gas relative to another or separation of a noble gas from a mixture of noble gas and nitrogen. An embodiment of an MOF of cobalt formate has the formula: $Co_3(HCOO)_6DMF$.

A MOF of cobalt formate was prepared in a similar manner described by Li et. al., Adv. Func. Mater. 2008, 18, 2205-2214. Cobalt nitrate hexahydate (1 equivalent) and formic acid (6.6 equivalents) were combined in DMF and heated to 100° C. for 20 hours. After cooling to room temperature over a period of 2.5 hours, the solid cobalt formate-DMF complex was isolated by filtration. The cobalt formate-DMF solid was washed with DMF and diethyl ether and then placed under vacuum at room temperature for 24 hours to remove unbound solvent. The DMF in the cobalt formate-DMF complex was removed by heating between 110° C. and 150° C. under vacuum to give cobalt formate.

Figure 4:
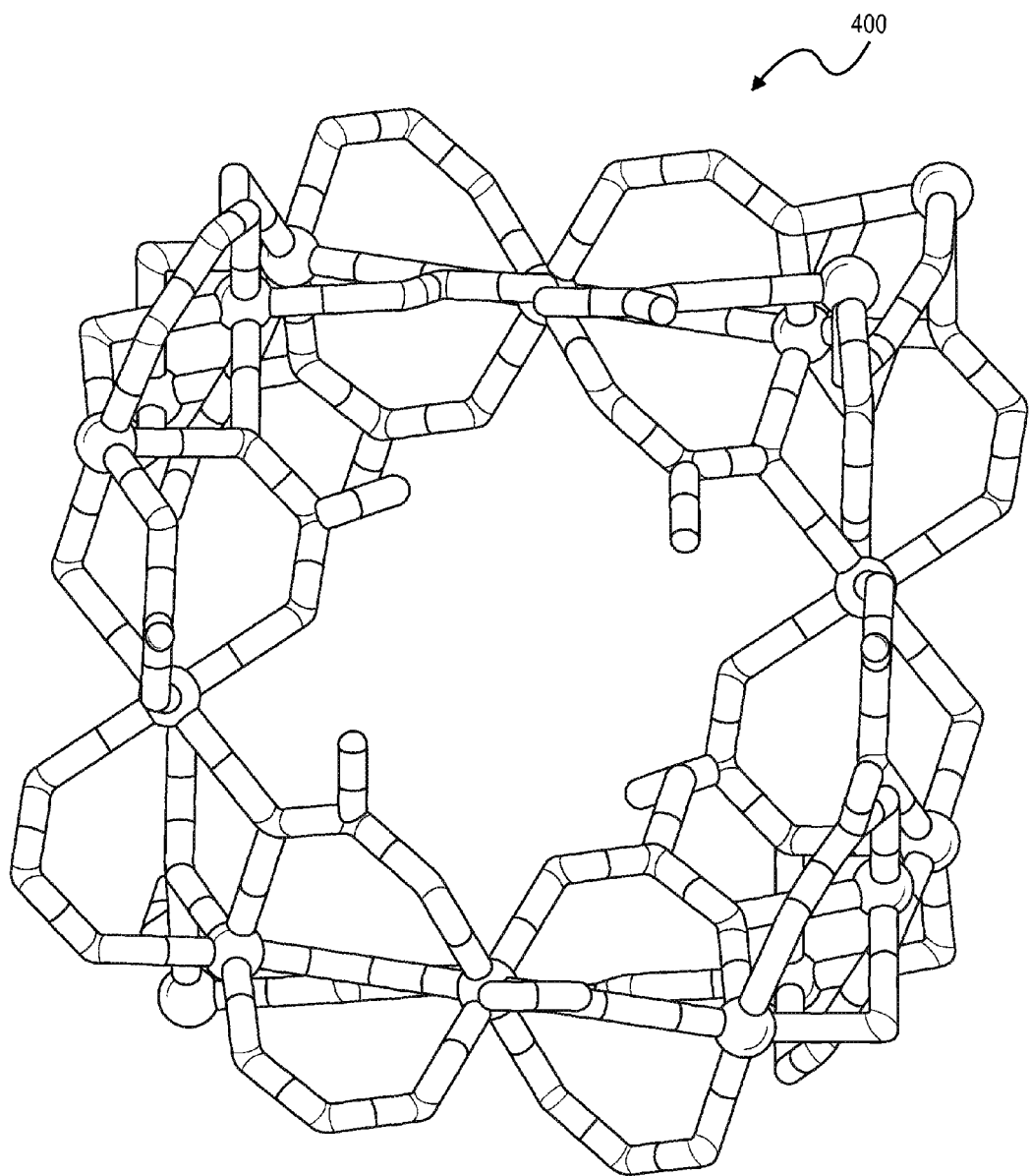
FIG. 4 illustrates a cobalt formate MOF.

FIG. 4 illustrates a cobalt formate MOF 400 synthesized as described. The cobalt formate MOF synthesized as described obtained a Kr/$N_2$ ideal selectivity (ratio of Henry's constants) of 5.4 at 292 K, with an uptake of 20 cubic centimeters per gram ($cm^3/g$) at standard temperature and pressure. The described cobalt formate MOF 400 has the ability to adsorb (e.g., trap) noble gases and selectively separate such gases from one another and/or from nitrogen.

Figure 5:
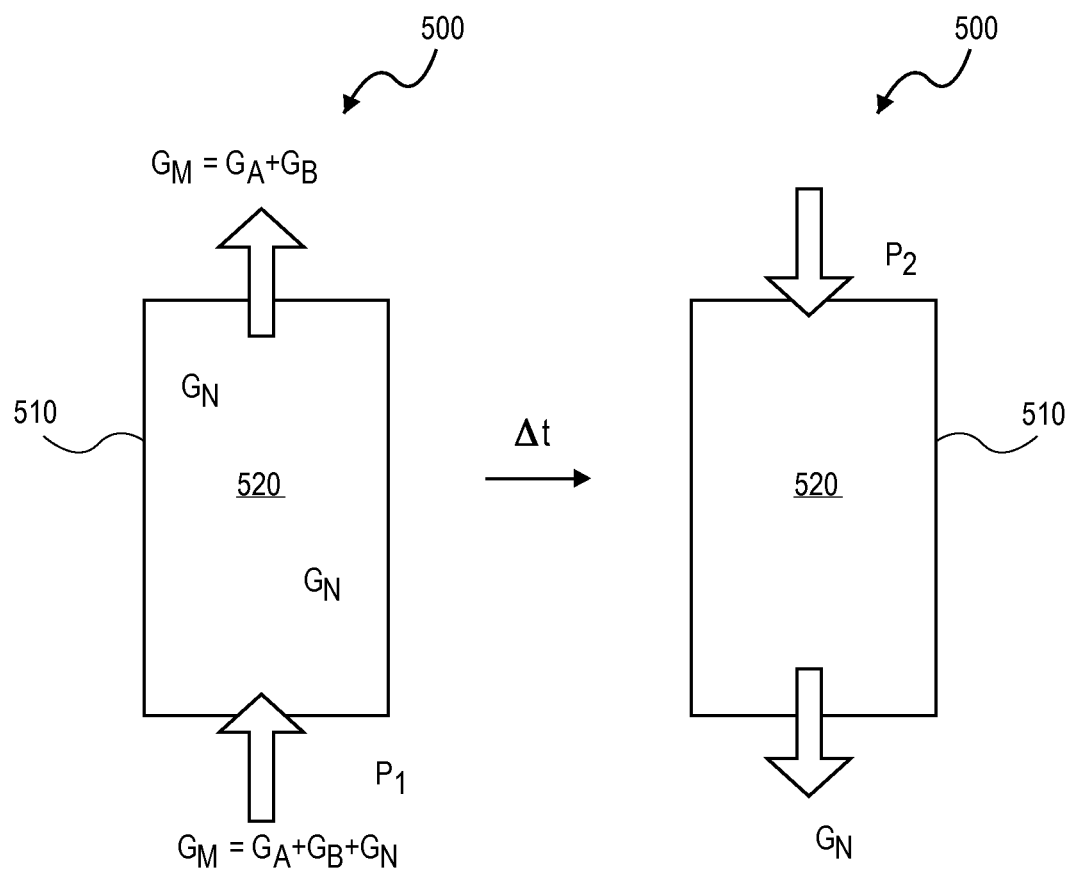
FIG. 5 illustrates a pressure-swing adsorption process.

In another embodiment, an adsorbent bed is described that is operable to adsorb a noble gas from a mixture of gases. The adsorbent bed includes a MOF such as described above including an organic electron donor having the formula of General Formula I or General Formula II or the synthesized cobalt formate MOF. Such adsorbent bed is operable for use in a pressure-swing adsorption process or a temperature-swing adsorption process. FIG. 5 illustrates a pressure-swing adsorption process. In a pressure swing adsorption process to separate a gas from a mixture of gases, the mixture of gases is passed through an adsorbent bed at a high pressure. Representatively, an adsorbent bed includes pelletized MOFs such as MOFs combined with a binder such as graphite, bentonite, alumina and/or silica or other binder and pressed or extruded under pressure to generate a defined shape (e.g., cylinder, sphere, granule, etc.). U.S. Publication No. 2009/0155588 provides a pellet description. FIG. 5 shows system 500 including vessel 510 containing adsorbent bed 520 of a MOF as described herein. Gas mixture, $G_M$, including gases $G_A$, $G_B$ and a noble gas ($G_N$) is passed through bed 520 at pressure $P_1$ (a relatively high pressure such as one to 20 atmospheres). Under these conditions, the noble gas ($G_N$) is selectively adsorbed (e.g., trapped) in adsorbent bed 520 relative to the other gases in the gas mixture (relative to $G_A$ and $G_B$). After time ($\Delta t$), a pressure $P_2$ that is less than $P_1$ is passed through adsorbent bed 520 and the noble gas ($G_N$) is released.

A temperature-swing adsorption process utilizes temperature to assist in the adsorption and removal of a noble gas from a mixture of gases. Representatively, a mixture of gases is passed through an adsorbent bed, such as adsorbent bed 520 of a MOF such as described herein, at a first temperature (a relatively low temperature). The noble gas is selectively adsorbed (e.g., trapped) in the adsorbent bed relative to the other gases in the mixture. After a time, the temperature of the adsorbent bed is increased to a second temperature and the noble gas is released from the adsorbent bed.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated in the figure to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description, various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
exposing a gas mixture comprising a noble gas to a metal organic framework (MOF), including an organic electron donor having the formula of:

General Formula I:

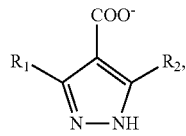

wherein $R_1$ and $R_2$ are independently selected from a branched or straight chain alkyl moiety that may be substituted, or General Formula II:

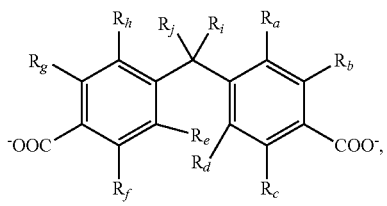

wherein $R_a$, $R_b$, $R_c$, $R_d$, $R_e$, $R_f$, $R_g$, and $R_h$ are independently selected from a hydrogen moiety, a straight or branched chain alkyl moiety having one to three carbons, an amine moiety, an ether moiety or a halide moiety and $R_i$ and $R_j$ are independently selected from a trifluoromethyl, a straight or branched chain alkyl moiety having one to three carbons, or a phenyl moiety; with the proviso that $R_a$, $R_b$, $R_c$, $R_d$, $R_e$, $R_f$, $R_g$, and $R_h$ are not each selected from a hydrogen moiety when $R_i$ and $R_j$ are each a trifluoromethyl moiety.

2. The method of claim 1, wherein the electron donor is the electron donor of General Formula I and $R_1$ and $R_2$ are independently an alkyl moiety having one to three carbon atoms.

3. The method of claim 2, wherein $R_1$ and $R_2$ are each an ethyl moiety.

4. The method of claim 2, wherein $R_1$ and $R_2$ are each a methyl moiety.

5. The method of claim 2, wherein $R_1$ and $R_2$ area methyl moiety and an ethyl moiety, respectively.

6. The method of claim 1, wherein the electron donor is the electron donor of General Formula II and $R_i$ and $R_j$ are each trifluoromethyl.

7. The method of claim 6, wherein $R_c$ and $R_f$ are each an unsubstituted amine moiety.

8. The method of claim 6, wherein $R_c$ and $R_f$ are each a methyl moiety.

9. The method of claim 6, wherein $R_b$, $R_c$, $R_f$ and $R_g$ are each a chloride moiety.

10. The method of claim 1, wherein the electron donor is the electron donor of General Formula II and $R_i$ and $R_j$ are each ethyl.

11. The method of claim 1, wherein the electron donor is the electron donor of General Formula II and $R_i$ and $R_j$ are each phenyl.

12. The method of claim 1, wherein exposing the gas mixture to the MOF comprises exposing at a first pressure for a first time period and, after the first time period, the method comprises exposing any noble gas adsorbed to the MOF to a different second pressure.

13. The method of claim 1, wherein exposing the gas mixture to the MOF comprises exposing at a first temperature for a first time period and, after the first time period, the method comprises exposing any noble gas adsorbed to the MOF to a different second temperature.

14. An adsorbent bed operable to adsorb a noble gas from a mixture of gases, the adsorbent bed comprising:
a metal organic framework (MOF) including an organic electron donor having the formula of:

General Formula I:

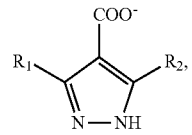

wherein $R_1$ and $R_2$ are independently selected from a branched or straight chain alkyl moiety that may be substituted, or General Formula II:

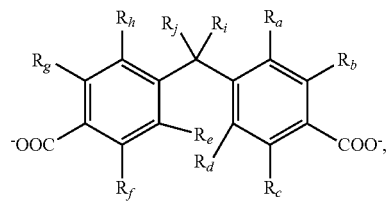

wherein $R_a$, $R_b$, $R_c$, $R_d$, $R_e$, $R_f$, $R_g$ and $R_h$ are independently selected from a hydrogen moiety, a straight or branched chain alkyl moiety having one to three carbons, an amine moiety, an ether moiety or a halide moiety and $R_i$ and $R_j$ are independently selected from a trifluoromethyl, a straight or branched chain alkyl moiety having one to three carbons, or a phenyl moiety; with the proviso that $R_a$, $R_b$, $R_c$, $R_d$, $R_e$, $R_f$, $R_g$, and $R_h$ are not each selected from a hydrogen moiety when $R_i$ and $R_j$ are each a trifluoromethyl moiety.

15. The bed of claim 14, wherein the electron donor is the electron donor of General Formula I and $R_1$ and $R_2$ are independently an alkyl moiety having one to three carbon atoms.

16. The bed of claim 15, wherein $R_1$ is an ethyl moiety.

17. The bed of claim 14, wherein the electron donor is the electron donor of General Formula II and $R_i$ and $R_j$ are each trifluoromethyl.

18. A method comprising:
 exposing a gas mixture comprising a noble gas to a metal organic framework (MOF) comprising cobalt formate; and
 separating the noble gas from the gas mixture.

* * * * *